(12) United States Patent
Abe (10) Patent No.: US 11,105,960 B2
(45) Date of Patent: Aug. 31, 2021

(54) OPTICAL ELEMENT AND METHOD OF PRODUCING THE ELEMENT, AND OPTICAL INSTRUMENT

(71) Applicant: CANON KABUSHIKI KAISHA, Tokyo (JP)

(72) Inventor: Keiko Abe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 16/216,410

(22) Filed: Dec. 11, 2018

(65) Prior Publication Data

US 2019/0187333 A1    Jun. 20, 2019

(30) Foreign Application Priority Data

Dec. 19, 2017  (JP) .............................. JP2017-243013
Nov. 27, 2018  (JP) .............................. JP2018-221464

(51) Int. Cl.
*G02B 1/113* (2015.01)
*G02B 1/118* (2015.01)

(52) U.S. Cl.
CPC .............. *G02B 1/113* (2013.01); *G02B 1/118* (2013.01); *G02B 2207/107* (2013.01)

(58) Field of Classification Search
CPC .... G02B 1/113; G02B 1/118; G02B 2207/107
See application file for complete search history.

(56) References Cited

U.S. PATENT DOCUMENTS

| 7,771,832 | B2 | 8/2010 | Nakayama et al. |
| 7,811,684 | B2 | 10/2010 | Yamada et al. |
| 7,931,936 | B2 | 4/2011 | Yamada et al. |
| 8,034,437 | B2 | 10/2011 | Nakayama et al. |
| 8,084,082 | B2 | 12/2011 | Nakayama et al. |

(Continued)

FOREIGN PATENT DOCUMENTS

| CN | 101425551 A | 5/2009 |
| CN | 103364848 A | 10/2013 |
| CN | 104813199 A | 7/2015 |

(Continued)

OTHER PUBLICATIONS

Nakayama et. al. ("Preparation of TiO2 nanoparticles surface-modified by both carboxylic acid and amine: Dispersibility and stabilization in organic solvents", Colloids and Surfaces A: Physicochemical and Engineering Aspects, vol. 317, pp. 543-550, Mar. 2008). (Year: 2008).*

(Continued)

*Primary Examiner* — Robert E. Tallman
(74) *Attorney, Agent, or Firm* — Venable LLP (57) ABSTRACT

A related-art optical element using an antireflection film having a layer having an uneven structure or a porous layer has involved a problem in that the performance of the antireflection film is degraded by $SO_2$ in an exhaust gas. In view of the problem, provided are an optical element in which a positive ion spectrum of a surface of an antireflection film measured by TOF-SIMS has a peak of $C_mH_nN^+$, where m represents an integer of 1 or more to 8 or less, and n represents an integer of 2 or more to 16 or less, and a method of producing the element.

20 Claims, 7 Drawing Sheets

(56) References Cited

U.S. PATENT DOCUMENTS

| | | |
|---|---|---|
| 8,163,333 B2 | 4/2012 | Nakayama et al. |
| 8,501,270 B2 | 8/2013 | Yamada et al. |
| 8,541,049 B2 | 9/2013 | Nakayama et al. |
| 8,778,450 B2 | 7/2014 | Zhang et al. |
| 8,987,039 B2 | 3/2015 | Hurley et al. |
| 8,999,488 B2 | 4/2015 | Zhang et al. |
| 10,738,197 B2 | 8/2020 | Nakayama et al. |
| 2005/0233113 A1 | 10/2005 | Kotani et al. |
| 2009/0022954 A1 | 1/2009 | Kotani et al. |
| 2009/0096106 A1 | 4/2009 | Vrtis et al. |
| 2013/0260096 A1* | 10/2013 | Shiki .................. C23C 18/1216 428/142 |
| 2015/0316691 A1 | 11/2015 | Nakayama et al. |
| 2018/0251399 A1* | 9/2018 | Koch, III .............. A01N 55/00 |

FOREIGN PATENT DOCUMENTS

| | | |
|---|---|---|
| CN | 106526715 A | 3/2017 |
| JP | 2005-275372 A | 10/2005 |
| JP | 2006-259711 A | 9/2006 |
| JP | 2008-203827 A | 9/2008 |
| JP | 2008-233880 A | 10/2008 |
| JP | 2013-228728 A | 11/2013 |
| WO | 2017/040467 A1 | 3/2017 |

OTHER PUBLICATIONS

First Office Action in Chinese Application No. 201811555862.5 (dated Oct. 14, 2020).

Second Office Action in Chinese Application No. 201811555862.5 (dated May 2021).

\* cited by examiner

OPTICAL ELEMENT AND METHOD OF PRODUCING THE ELEMENT, AND OPTICAL INSTRUMENT

BACKGROUND OF THE INVENTION

Field of the Invention

The present invention relates to an optical element, such as a lens, and a method of producing an optical element.

Description of the Related Art

It has been known that an antireflection structural body using a fine uneven structure having a height equal to or less than a wavelength in a visible light region shows excellent antireflection performance in a wide wavelength region through the formation of a fine structure having an appropriate pitch and an appropriate height.

For example, the application of a film having dispersed therein fine particles each having a particle diameter equal to or less than a visible light wavelength has been known as a method of forming a fine periodic structure. In addition, it has been known that a method of forming a fine periodic structure through pattern formation with a fine processing apparatus, such as an electron beam drawing apparatus, a laser interference exposure apparatus, a semiconductor exposure apparatus, or an etching apparatus, enables the control of the pitch and height of the structure, and enables the formation of a fine periodic structure having an excellent antireflection property.

In addition, it has been known that boehmite serving as a hydroxide oxide of aluminum is grown on a substrate to provide an antireflection effect. In each of those methods, an antireflection film is obtained by subjecting an aluminum oxide (alumina) film formed by a vacuum deposition method or a liquid phase method (sol-gel method) to a water vapor treatment or a hot-watermersion treatment to turn its surface layer into boehmite so that a fine structure may be formed. In particular, it has been known that in the method of forming an antireflection film through the use of the fine structure of boehmite, reflectances based on vertical incidence and oblique incidence are extremely low, and hence excellent antireflection performance is obtained (Japanese Patent Application Laid-Open No. 2005-275372).

The control of the structure and size of an antireflection film having a fine structure produced by any such approach has limitations. Accordingly, various kinds of contrivance have been made to further improve the antireflection performance of the film. For example, an approach involving providing an intermediate refractive index layer for optimizing a refractive index structure and suppressing an influence from a glass material, or an approach involving incorporating a phosphate compound or a carboxylic acid compound into an aluminum oxide layer for preventing contamination from an external environment has been known (Japanese Patent Application Laid-Open No. 2006-259711, Japanese Patent Application Laid-Open No. 2008-203827, Japanese Patent Application Laid-Open No. 2008-233880, and Japanese Patent Application Laid-Open No. 2013-228728).

In recent years, however, product performance, such as the stability of the quality of a product at the time of its production or the suppression of a fluctuation in quality thereof due to various environmental tests, has been more strictly required. In particular, in an urban area where the amount of gases exhausted from automobiles is large, when an antireflection film is continuously exposed to an external environment for a long time period, the degradation of its performance due to $SO_2$ in an exhaust gas becomes a problem. The phosphate compound or the carboxylic acid compound serving as related art has a low suppressing effect on the degradation of the performance of the antireflection film due to an exhaust gas.

SUMMARY OF THE INVENTION

According to one aspect of the present invention, there is provided an optical element including: a substrate; and an antireflection film provided on the substrate, the antireflection film having one of a layer having an uneven structure and a porous layer, a positive ion spectrum of a surface of the antireflection film measured by TOF-SIMS having a peak of $C_mH_nN^+$, where m represents an integer of 1 or more to 8 or less, and n represents an integer of 2 or more to 16 or less.

According to another aspect of the present invention, there is provided a method of producing an optical element including: forming an antireflection film having one of a layer having an uneven structure and a porous layer; and then causing a component derived from $C_mH_nN^+$, where m represents an integer of 1 or more to 8 or less, and n represents an integer of 2 or more to 16 or less, to adhere to a surface of the antireflection film through use of an organic amine compound.

According to still another aspect of the present invention, there is provided an optical instrument configured to produce an image with light that has passed an optical element including a substrate and an antireflection film arranged on the substrate, the antireflection film having one of a layer having an uneven structure and a porous layer, a positive ion spectrum of a surface of the antireflection film measured by TOF-SIMS having a peak of $C_mH_nN^+$, where m represents an integer of 1 or more to 8 or less, and n represents an integer of 2 or more to 16 or less.

Further features of the present invention will become apparent from the following description of exemplary embodiments with reference to the attached drawings.

DESCRIPTION OF THE EMBODIMENTS

An object of this embodiment is to provide an optical member having satisfactory optical characteristics even under such a use environment that an exhaust pas adversely affects the member, and a method of producing the member.

According to this embodiment, there can be provided an optical element having formed thereon an antireflection film using a fine uneven structure, the optical element having satisfactory resistance to an exhaust gas.

An embodiment of the present invention is described in detail below.

As described above, the optical element of the present invention is an optical element including a substrate and an antireflection film provided on the substrate, the antireflection film having a layer having an uneven structure or a porous layer, the optical element having a feature in that a positive ion spectrum of a surface of the antireflection film measured by TOF-SIMS has a peak of $C_mH_nN^+$, where m represents an integer of 1 or more to 8 or less, and n represents an integer of 2 or more to 16 or less.

(Substrate)

A substrate 1 to be used in the optical element of the present invention is, for example, a glass material, a plastic substrate, a glass mirror, or a plastic mirror.

Examples of the glass material include an alkali-containing glass, an alkali-free glass, an alumina silicate glass, a borosilicate glass, a barium-based glass, a lanthanum-based glass, a titanium-based glass, and a fluorine-based glass.

Typical examples of the plastic substrate include: films and molded articles of thermoplastic resins, such as polyester, triacetylcellulose, cellulose acetate, polyethylene terephthalate, polypropylene, polystyrene, polycarbonate, polymethyl methacrylate, an ABS resin, polyphenylene oxide, polyurethane, polyethylene, and polyvinyl chloride; and crosslinked films and crosslinked molded articles obtained from various thermosetting resins, such as an unsaturated polyester resin, a phenol resin, crosslinking-type polyurethane, a crosslinking-type acrylic resin, and a crosslinking-type saturated polyester resin.

Figure 1:
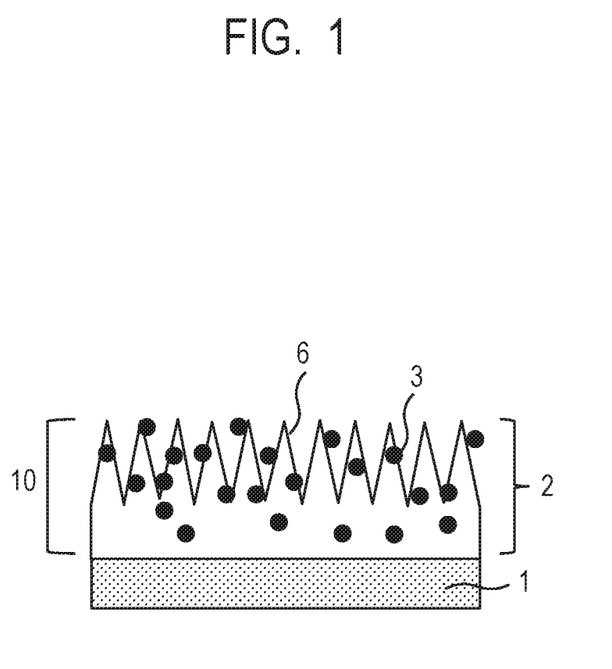
FIG. 1 is a schematic view for illustrating an optical element according to one embodiment of the present invention.

A case in which the substrate 1 is a flat plate is illustrated in FIG. 1, but the present invention is not limited thereto. An optical member of a shape, such as a biconvex lens, a planoconvex lens, a convex meniscus lens, a biconcave lens, a planoconcave lens, a concave meniscus lens, an aspherical lens, or a free-form surface lens, is also permitted.

First Embodiment (Antireflection Film Having Layer Having Uneven Structure to which Organic Amine Compound Adheres)

An optical element according to one embodiment of the present invention is an optical element including an antireflection film formed on the surface of a substrate, and the outermost surface layer of the antireflection film has a crystal layer having an uneven structure, the layer containing an aluminum oxide crystal. The surface of the crystal layer is the uneven structure (protruding structure). In addition, the element has a feature in that an organic amine compound is incorporated into part or the entirety of the crystal layer.

FIG. 1 is a schematic view for illustrating an optical element according to one embodiment of the present invention. The optical element of this embodiment is an optical element including an antireflection film 10 formed on the surface of a substrate 1 having a flat plate shape. In FIG. 1, the optical element of this embodiment is obtained by providing a crystal layer 2 having an uneven structure, the layer containing an aluminum oxide crystal, on the surface of the substrate 1. The uneven structure has many protrusions 6. In addition, the crystal layer 2 having the uneven structure contains an organic amine compound 3. The antireflection film 10 is constituted of the crystal layer 2.

The incorporation of the organic amine compound into part of the crystal layer having the uneven structure means that the molecules of the compound are scattered in part of the surface of the crystal layer 2 and/or are present halfway in a direction toward the substrate 1 as illustrated in, for example, FIG. 1. In addition, the organic amine compound may be incorporated into the entirety of the crystal layer 2 having the uneven structure.

The crystal layer 2 having the uneven structure to be used in this embodiment is a nanostructure of a specific material, and is such an antireflection film that an apparent refractive index lower than a refractive index intrinsic to the material changes in the thickness direction of the film. The specific material is preferably, for example, aluminum oxide.

Specifically, the uneven structure is achieved by a fine structure having dimensions shorter than the use wavelength of an optical part in which the antireflection film is used. The fine structure has, in itself, a plurality of closed spaces closed off to an outside atmosphere and/or a plurality of open spaces communicating with the outside atmosphere. As a result, the refractive index of the material constituting the antireflection film (refractive index intrinsic to the material) and the refractive index of a medium, such as air, occupying (filling) the spaces are averaged. Thus, the antireflection film has a refractive index lower than the refractive index of the material constituting the antireflection film (refractive index intrinsic to the material), and hence the apparent refractive index of the antireflection film can be reduced. In other words, the refractive index intrinsic to the material is the refractive index of a nonporous thin film or bulk of the material, and the apparent refractive index is the refractive index of a film of the fine structure reduced by the presence of the spaces.

In addition, the apparent refractive index may be changed by changing the occupancy of the spaces or the occupancy of solid portions in the antireflection film in the thickness direction of the film.

Figure 2:
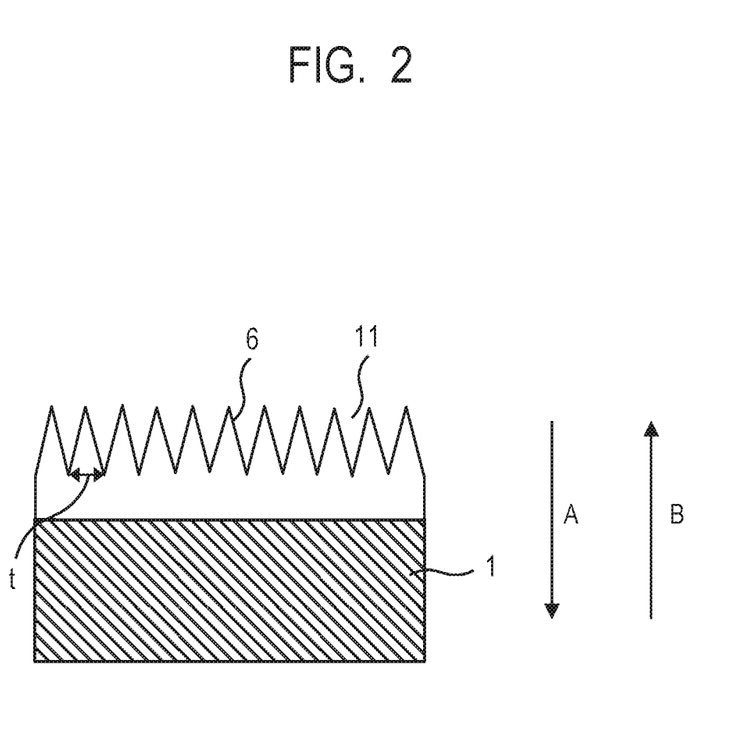
FIG. 2 is a view for schematically illustrating a section of the optical element according to the one embodiment of the present invention.

FIG. 2 is a view for schematically illustrating a section of the antireflection film to be used in one embodiment of the present invention, and the film has the solid portions (protrusions) 6 and spaces 11. It is preferred that the apparent refractive index be increased intermittently or continuously from the incident side of light along the traveling direction of the light (arrow A). Alternatively, it is preferred that the apparent refractive index be reduced intermittently or continuously from the incident side of the light along the traveling direction of the light (arrow B). In particular, the antireflection film preferably has the following optical characteristics: the refractive index of the outermost surface of the antireflection film in contact with the outside atmosphere is close to 1, and as a depth from the outermost surface increases in the thickness direction of the antireflection film, the refractive index of the antireflection film gradually increases so that the refractive index may approach the refractive index intrinsic to the material constituting the antireflection film (e.g., from 1.4 to 3.0).

The antireflection film may be a structure in which at least two fine structures different from each other in occupancy of the spaces or the solid portions are laminated, or the occupancy of the spaces or the solid portions is provided with a distribution so as to vary from site to site. In addition, in the outermost surface side of the antireflection film, the spaces communicate to the outside atmosphere, and hence the film has a fine uneven structure that is not smooth. The thickness (t) of a protruded portion (protrusion) of the structure is smaller than the use wavelength of the element, and specifically has a size of the order of nanometers.

(Relationship Between Fine Uneven Structure and Substrate)

In the above-mentioned embodiment, the aluminum oxide crystal constituting the crystal layer 2 having the uneven structure is formed of an oxide or hydroxide of aluminum, or a hydrate thereof. A particularly preferred crystal is boehmite. In addition, when any such crystal is arranged, its end portions form fine protrusions. Accordingly, in order that the heights of the protrusions may be increased, and an interval therebetween may be narrowed, the crystal is selectively arranged at a specific angle relative to the surface of the substrate.

Figure 3A:
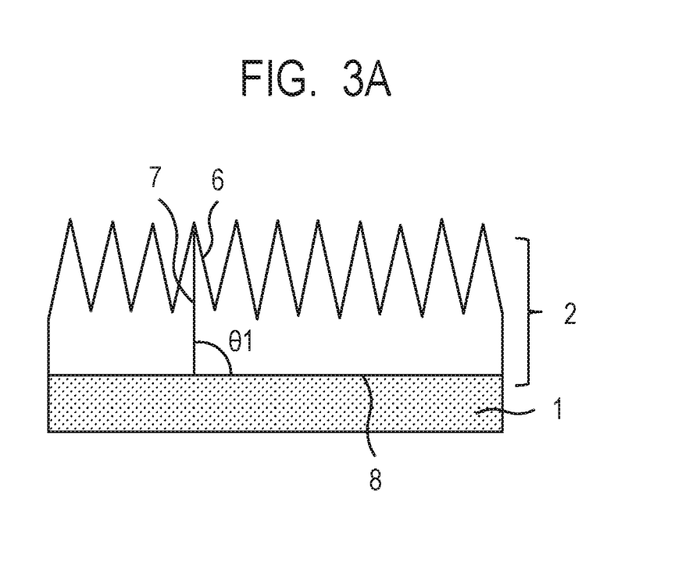
FIG. 3A and FIG. 3B are each a schematic view for illustrating a relationship between an uneven structure containing an aluminum oxide crystal and a substrate in the optical element according to the one embodiment of the present invention.

FIG. 3A and FIG. 3B are each a schematic view for illustrating a relationship between the uneven structure containing the aluminum oxide crystal and the substrate in the embodiment of the present invention. When the surface of the substrate 1 is a flat surface, such as a flat plate, a film, or a sheet, as illustrated in FIG. 3A, the protrusions 6 are desirably arranged so that the average angle of angles θ1 formed by inclination directions 7 of the protrusions 6 and a substrate surface 8 relative to the substrate surface 8 may be 45° or more to 90° or less, preferably 60° or more to 90° or less.

Figure 3B:
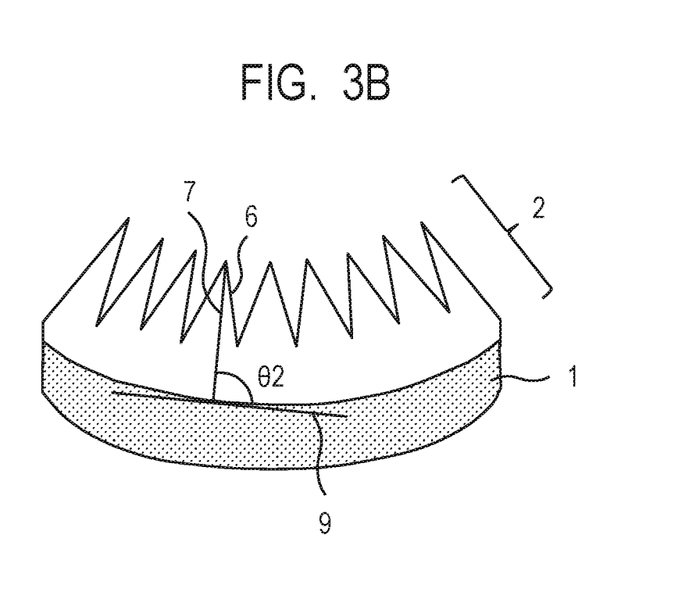

In addition, when the surface of the substrate 1 has a two-dimensional or three-dimensional curved surface, as illustrated in FIG. 3B, the protrusions 6 are desirably arranged so that the average angle of angles θ2 formed by the inclination directions 7 of the protrusions 6 and tangents 9 to the substrate surface 8 relative to the surface of the substrate may be 45° or more to 90° or less, preferably 60° or more to 90° or less. The values of the angles θ1 and θ2 are more than 90° depending on the inclinations of the protrusions in some cases. In those cases, however, values measured under such conditions as to be 90° or less are adopted.

The thickness of the crystal layer 2 having the uneven structure is preferably 20 nm or more to 1,000 nm or less, more preferably 50 nm or more to 1,000 nm or less. When the thickness of the crystal layer 2 having the uneven structure is 20 nm or more to 1,000 nm or less, antireflection performance is effectively exhibited by the uneven structure. In addition, a risk in that the mechanical strength of each of the protrusions is impaired is eliminated, and hence production cost for the uneven structure can be reduced. In addition, a case in which the thickness is set to 50 nm or more to 1,000 nm or less is more preferred because the antireflection performance is further improved.

In addition, another intermediate layer may be formed between the antireflection film having such fine uneven structure (protrusions) and the substrate. A solid film having a refractive index intermediate between the apparent refractive index of the antireflection film and the refractive index of the substrate is preferably used as such intermediate layer. Specifically, the film may be an inorganic material, such as a metal compound listed as a material for the antireflection film, or an organic material, such as a resin typified by polyimide.

(Organic Amine Compound)

The crystal layer having the fine uneven structure is porous. Accordingly, when the layer is continuously exposed to an environment having a high exhaust gas concentration for a long time period, a harmful gas, such as $SO_2$, in an exhaust gas is liable to be absorbed in the layer. In that case, such problems as described below are liable to occur: characteristics, such as the refractive index of the entirety of the crystal layer, change, or fogging occurs in the appearance of the layer.

The organic amine compound 3 in the present invention has an action of absorbing $SO_2$, and has a weak alkaline property. When a proper amount of the compound is caused to exist in the outermost surface of the crystal layer, the following effects may occur: the intrusion of $SO_2$ into the crystal layer is inhibited, and the change of the crystal layer that is weakly acidic is suppressed. However, when a large amount of the organic amine compound adheres to the layer, the amine compound itself serves as a contaminant to adversely affect the reflectance performance of the antireflection.

The presence amount of the organic amine compound may be calculated from time-of-flight secondary ion mass spectrometry (TOF-SIMS analysis). In a positive ion spectrum obtained by the analysis, the ratio of the peak intensity of $C_mH_nN^+$, where m represents an integer of 1 or more to 8 or less, and n represents an integer of 2 or more to 16 or less, to the peak intensity of representing the presence of the crystal layer is preferably 1E−04 or more to 1E−02 or less, more preferably 1.6E−04 or more to 9.5E−03 or less. When the ratio is less than 1E−04, the amount of the organic amine compound is so small that the $SO_2$ intrusion-inhibiting effect is not exhibited. In contrast, when the ratio is more than 1E−02, the organic amine compound serves as a contaminant to adversely affect the transparency and reflectance performance of the antireflection With regard to the ratio of the peak intensity of $C_mH_nN^+$, where m represents an integer of 1 or more to 8 or less, and n represents an integer of 2 or more to 16 or less, to the peak intensity of $Al^+$ representing the presence of the crystal layer in this specification, when a plurality of peaks each corresponding to $C_mH_nN^+$ are present as a result of the measurement, a peak having the highest peak intensity is defined as a judgment object.

(Method of Producing Optical Element Including Antireflection Film Having Layer Having Uneven Structure)

A method of producing an optical element according to one embodiment of the present invention is a method of producing an optical element including an antireflection film formed on the surface of a substrate, the method having a feature of including the following three steps A, B, and C.

A. A step of forming an aluminum oxide layer including aluminum oxide on the substrate.

B. A step of bringing the aluminum oxide layer into contact with hot water or water vapor at 60° C. or more to 100° C. or less to form a crystal layer having an uneven structure.

C. A step of causing an organic amine compound to adhere onto the crystal layer.

Figure 4A:
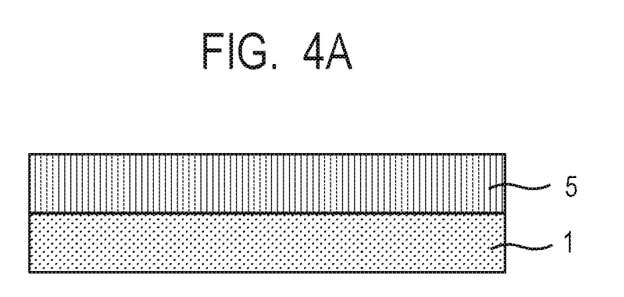
FIG. 4A, FIG. 4B, and FIG. 4C are step views for illustrating a method of producing an optical element according to one embodiment of the present invention.
Figure 4B:
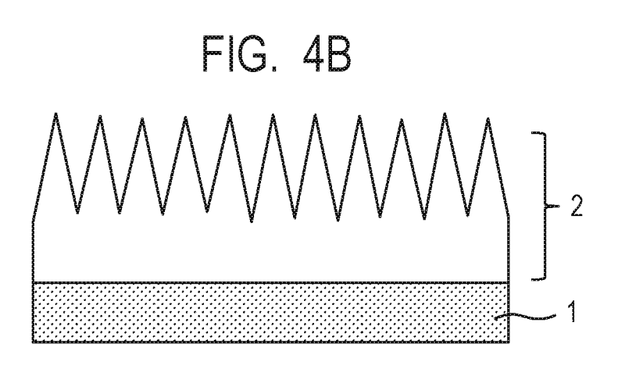
Figure 4C:
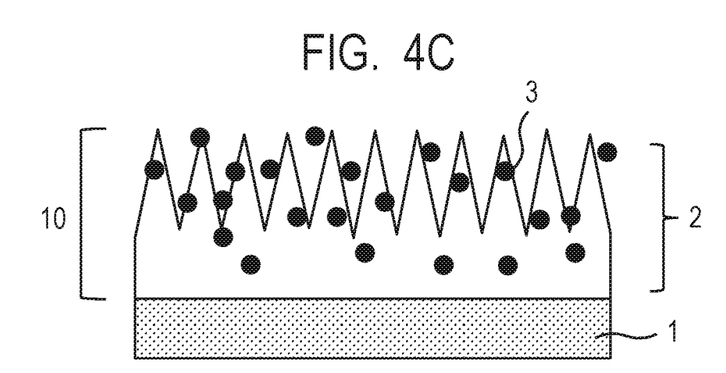

FIG. 4A, FIG. 4B, and FIG. 4C are step views for illustrating a method of producing an optical element according to one embodiment of the present invention.

The aluminum oxide crystal layer refers to the crystal layer 2 deposited and grown on the surface layer of a film containing aluminum oxide by bringing the film into contact with hot water or water vapor to cause the surface layer of the aluminum oxide film to undergo peptization or the like, and its form is a fine uneven structure. Crystals of various sizes are randomly arranged on the crystal layer 2 formed of the uneven structure, and their upper end portions form protrusions. Accordingly, in order that the heights, sizes, and angles of the protrusions, and an interval between the protrusions may be changed, the deposition and growth of the crystals need to be controlled.

FIG. 4A is an illustration of the step A of forming an aluminum oxide layer 5 containing aluminum oxide on the substrate 1.

The surface of the antireflection film 10 having the fine uneven structure in the present invention is of an uneven shape because of a plate-shaped crystal film. The plate-shaped crystal is formed by immersing a film containing aluminum in hot water to dissolve and reprecipitate the surface of the film containing aluminum.

The film containing aluminum may be a film containing aluminum oxide as a main component, the film being formed by a sol-gel method or the like, a metal aluminum film formed by using a vapor growth method, such as a known CVD method or a PVD method, such as vapor deposition or sputtering, or a metal film or oxide film containing an aluminum metal.

In addition, a mixture of a compound of each of zirconium, silicon, titanium, and zinc, and an aluminum compound may be used as a raw material for the film containing aluminum. Alkoxides and chlorides of the respective metals, and salt compounds thereof, such as nitrates, may be used as raw materials for zirconia, silica, titania, zinc oxide, and alumina. A metal alkoxide is particularly preferably used as a raw material for zirconia, silica, or titania from the viewpoint of film formability.

FIG. 4B is an illustration of the step B of bringing the aluminum oxide layer into contact with the hot water or the water vapor to form the crystal layer having the uneven structure. An aluminum oxide crystal is formed by bringing the surface of the aluminum oxide film into contact with the hot water. The temperature of the hot water is set within the range of from 60° C. or more to 100° C. or less, and the layer is brought into contact with the hot water for from 5 minutes to 24 hours, and is then dried.

A method described in, for example, Japanese Patent Application Laid-Open No. 2006-259711 or Japanese Patent Application Laid-Open No. 2005-275372 may be used as such method.

The optical element of the present invention may further include a film for imparting various functions in addition to the film described above. For example, one or more films may be further provided as intermediate layers between the substrate and the antireflection film. Thus, the antireflection performance of the element can be further improved.

A solid film having a refractive index intermediate between the apparent refractive index of the antireflection film and the refractive index of the substrate is preferably used as any such intermediate layer. Specifically, the film may be an inorganic material, such as a metal compound listed as a material for the antireflection film, or an organic material, such as a resin typified by polyimide.

FIG. 4C is an illustration of the step C of causing the organic amine compound to adhere onto the crystal layer 2.

In the present invention, the organic amine compound to be caused to adhere onto the crystal layer is desirably selected from curing agent materials each containing a ketimine-based derivative. Specific examples thereof include a curing agent jER CURE H30 (trade name) manufactured by Mitsubishi Chemical Corporation and a curing agent EH-235R-2 (trade name) manufactured by Adeka Corporation. A curing agent having a ketimine group easily undergoes a hydrolysis reaction with water to produce an amine. Accordingly, an amine having, in a side chain thereof, an aliphatic hydrocarbon group having a moderate length is formed, and adheres to the surface of the crystal layer. Then, the amine exhibits such performance as to adsorb a harmful substance in an exhaust gas, such as $SO_2$, without reacting with aluminum oxide serving as a main component for the crystal layer.

In order that the organic amine compound may be caused to adhere to e surface of the crystal layer, those materials may be used alone, or may be used after having been mixed in a solvent or a resin. In addition, in order that the organic amine compound may be caused to adhere onto the crystal layer, the following methods are available: a method involving sealing the crystal layer in a container together with the curing agent material and then subjecting the entirety of the container to a heat treatment in an oven or the like; a method involving heating the curing agent material and causing the organic amine compound volatilized therefrom to adhere to the surface of the crystal layer; and a method involving directly coating the layer with the curing agent material diluted with a solvent. The direct coating method is desirably, for example, a spin coating method, a dip coating method, or a spray coating method. However, the amount of the compound to be caused to adhere to the layer needs to be extremely small, and hence such connivance as described below is required: when the curing agent material is volatilized, a small amount thereof is volatilized at a low temperature of 100° C. or less; or when the coating is performed, the curing agent material is diluted to a low concentration.

In addition, in the production method according to the present invention, a step of forming an intermediate refractive index layer may be provided before the formation of the aluminum oxide layer on the substrate.

Figure 5:
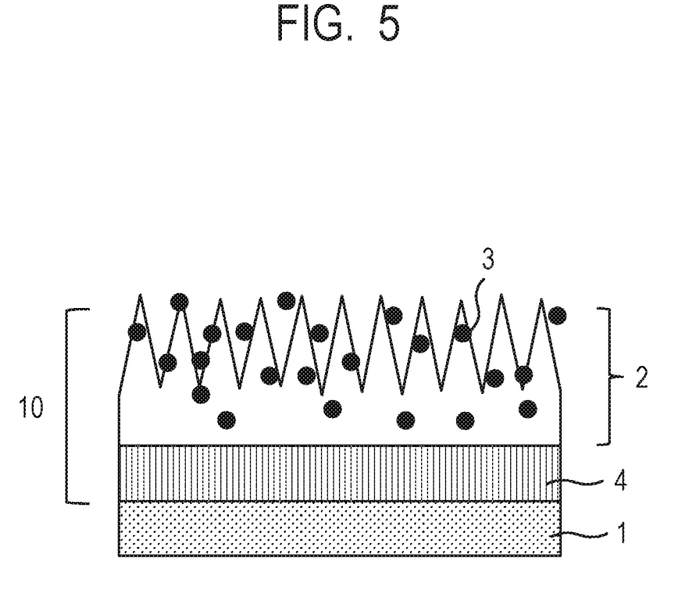
FIG. 5 is a schematic view for illustrating an optical element according to another embodiment of the present invention.

FIG. 5 is a schematic illustration of an example of an optical member in which an intermediate refractive index layer 4 is provided between the substrate 1 and the crystal layer 2 having the uneven structure, the layer containing the aluminum oxide crystal. In this case, the antireflection film 10 on the substrate 1 is constituted of the intermediate refractive index layer 4 and the crystal layer 2.

In the optical member having the intermediate refractive index layer 4 between the substrate 1 and the crystal layer 2, a refractive index nb of the substrate 1, a refractive index ni of the intermediate refractive index layer 4, and a refractive index ns of the crystal layer 2 having the uneven structure, the layer containing the aluminum oxide crystal, preferably satisfy a relationship of nb>ni>ns.

The intermediate refractive index layer 4 is preferably a transparent film formed of an inorganic material or an organic material. Examples of such inorganic material include metal oxides, such as $SiO_2$, $TiO_2$, $ZrO_2$, $ZnO$, and $Ta_2O_5$. A method of forming the intermediate refractive index layer 4 formed of an inorganic material is, for example, a vacuum deposition method, such as vapor deposition or sputtering, or a sol-gel method based on the application of a metal oxide precursor sol.

Examples of the organic material include polymers, such as an acrylic resin, an epoxy resin, an oxetane resin, a maleimide resin, a melamine resin, a benzoguanamine resin, a phenol resin, a resol resin, polycarbonate, polyester, polyarylate, polyether, polyurea, polyurethane, polyamide, polyamideimide, polyimide, polyketone, polysulfone, polyphenylene, polyxylylene, and polycycloolefin.

A method of forming the intermediate refractive index layer 4 formed of an organic material is, for example, a wet coating method involving forming the layer mainly through the application of a solution of the material.

In addition, when the intermediate refractive index layer is produced by a wet process, a drying step may be appropriately provided.

Second Embodiment (Antireflection Film Having Porous Layer to Which Organic Amine Compound Adheres)

Figure 6:
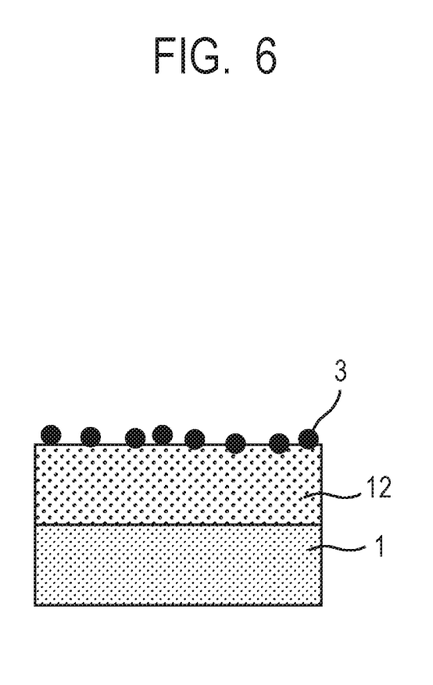
FIG. 6 is a schematic view for illustrating an optical element according to one embodiment of the present invention.

A second embodiment is described with reference to FIG. 6. In FIG. 6, a substrate is represented by reference numeral 1, a porous layer is represented by reference numeral 12, and an organic amine compound is represented by reference numeral 3. In an optical element according to the second embodiment of the present invention illustrated in FIG. 6, the porous layer 12 is used instead of the layer 2 having the uneven structure (see FIG. 4A, FIG. 4B, and FIG. 4C) described in the first embodiment. Even when the porous layer is used instead of the layer having the uneven structure, the same effects can be obtained. The second embodiment is identical to the first embodiment with the exception that the porous layer 12 is used instead of the layer 2 having the uneven structure, and hence detailed description thereof is omitted. The porous layer is, for example, a layer obtained by the deposition of fine particles or hollow particles of silicon oxide. A dispersion liquid obtained by dispersing the fine particles in water or a solvent may be applied by spin coating or the like, and the density of the resultant film is reduced by voids formed between the particles. Thus, a low-refractive index layer can be formed. The thickness of the porous layer is preferably 30 nm or more to 300 nm or less, more preferably 50 nm or more to 200 nm or less.

The presence amount of the organic amine compound 3 may be calculated from time-of-flight secondary ion mass spectrometry (TOF-SIMS analysis). In a positive ion spectrum obtained by the analysis, the ratio of the peak intensity of $C_mH_nN^+$, where m represents an integer of 1 or more to 8 or less, and n represents an integer of 2 or more to 16 or less, to the peak intensity of $Si^+$ representing the presence of the porous layer is preferably 1E−04 or more to 1E−02 or less. When the ratio is less than 1E−04, the amount of the organic amine compound is so small that a $SO_2$ intrusion-inhibiting effect is not exhibited. In contrast, when the ratio is more than 1E−02, the organic amine compound serves as a contaminant to adversely affect the transparency and reflectance performance of the antireflection film of the element. With regard to the ratio of the peak intensity of $C_mH_nN^+$, where m represents an integer of 1 or more to 8 or less, and n represents an integer of 2 or more to 16 or less, to the peak intensity of $Si^+$ representing the presence of the porous layer in this specification, when a plurality of peaks each corresponding to $C_mH_nN^+$ are present as a result of the measurement, a peak having the highest peak intensity is defined as a judgment object.

Third Embodiment

An example of an embodiment of an optical instrument of the present invention is described as a third embodiment. The optical instrument of the present invention may be of any form as long as the instrument is an instrument configured to produce an image with light that has passed the optical element of the present invention (e.g., an imaging apparatus, such as an interchangeable lens or a camera). In this embodiment, a network camera is described as an example.

Figure 7A:
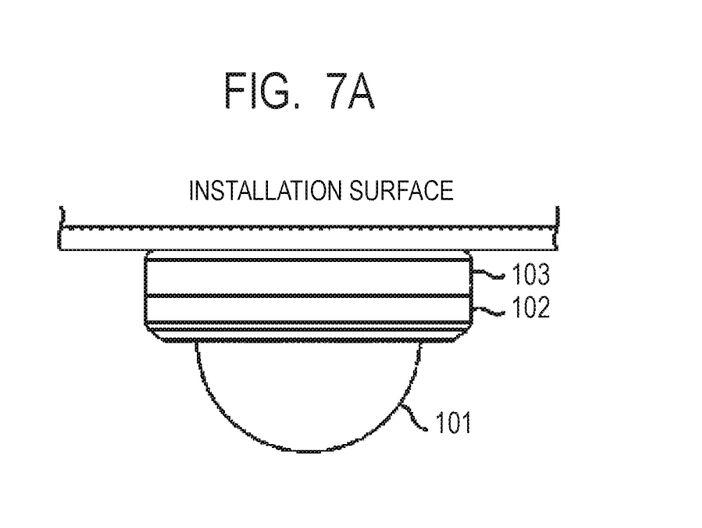
FIG. 7A and FIG. 7B are each a schematic view for illustrating the optical instrument according to the one embodiment of the present invention.
Figure 7B:
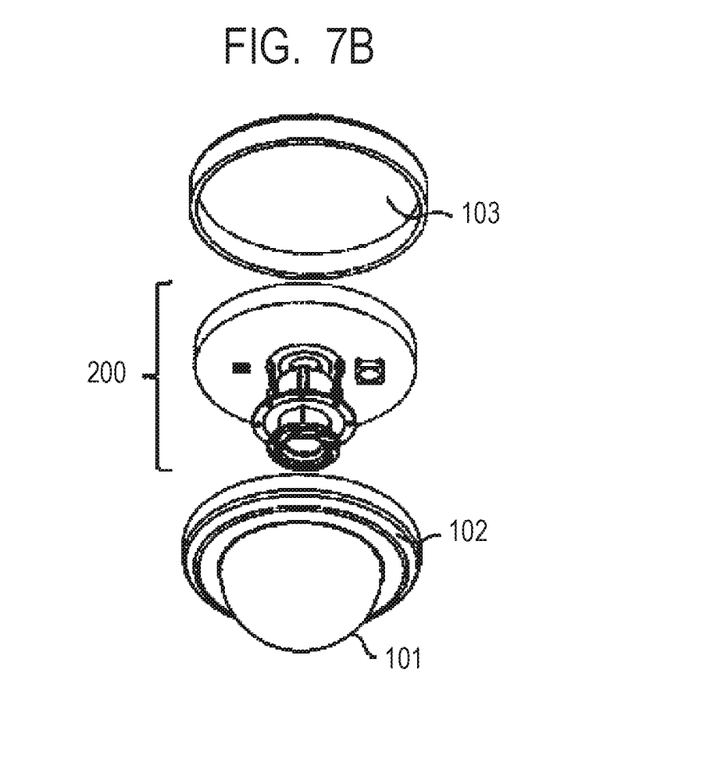

FIG. 7A is an appearance view of the network camera serving as an example of the optical instrument of the present invention, and FIG. 7B is an exploded perspective view of the network camera illustrated in FIG. 7A. In this embodiment, a network camera constituting an image monitoring system that is communicably connected to an external server (monitoring apparatus), such as an image monitoring center, wirelessly or through a wire to monitor a picked-up image on a server side is given as an example of the network camera, but the applications of the present invention are not limited thereto.

As illustrated in FIG. 7A and FIG. 7B, in the network camera of this embodiment, an imaging unit 200 is provided in an outer packaging cover formed of an upper cover 103, a lower cover 102, and a dome-shaped cover 101 (hereinafter referred to as "dome cover 101"). The imaging unit 200 preferably has a lens unit (not shown) formed of a plurality of lenses and an imaging element (not shown). The dome cover 101 is a substantially hemispherical transparent member that is arranged on the front side (object side) of the manageable range of the imaging unit 200 to protect the lens unit (not shown) in the imaging unit 200. The antireflection film of the present invention may be provided on the dome-shaped cover 101, or may be provided on at least one of the lenses constituting the lens unit in the imaging unit 200. In the case where the film is provided on at least one of the lenses constituting the lens unit, when the film is provided on the outermost side (lens most distant from the imaging element), the effects of the present invention can be obtained to a larger extent.

Next, the present invention is described in detail by way of Examples. However, the present invention is by no means limited to these Examples.

The performance evaluations of an antireflection film having a fine uneven structure obtained in each of Examples and Comparative Examples were performed by the following methods.

(Performance Evaluation)

A monitor glass having formed thereon an antireflection film was subjected to an appearance evaluation after an exhaust gas test (in which the presence/absence of the occurrence of fogging was visually observed), and reflectance evaluations before and after the exhaust gas test (in each of which a reflectance when the incident angle of light having a wavelength in the range of from 400 nm to 700 nm was 0° was measured with an absolute reflectance-measuring apparatus (USPM-RU (trade name), manufactured by Olympus Corporation)).

With regard to the appearance evaluation, a case in which fogging occurred was indicated by Symbol "C", and a case in which no fogging occurred was indicated by Symbol "A". With regard to each of the reflectance evaluations, the average of reflectances for light having a wavelength of from 400 nm to 700 nm was defined as an average reflectance, and a case in which its numerical value was 0.3 or less was indicated by Symbol "B", and a case in which the numerical value was more than 0.3 was indicated by Symbol "D".

EXAMPLE 1

(Formation of Antireflection Film Having Fine Uneven Structure)

A monitor glass that contained S-LAH55 (nd=1.83; manufactured by Ohara Inc. as a material, and was of a shape having a diameter of 30 mm and a thickness of 1 mm was used as an evaluation monitor glass.

The monitor glass was subjected to ultrasonic cleaning in an alkaline detergent, and was then dried in an oven. After that, a proper amount of an aluminum oxide precursor sol was dropped on the surface of the monitor glass, and spin coating was performed at a number of revolutions of 3,000 rpm for 20 seconds. After that, the resultant was calcined in a hot air-circulating oven at 140° C. for 30 minutes so that the surface was coated with an amorphous aluminum oxide film. After that, the resultant was immersed in hot water at 75° C. for 20 minutes to provide a sample in which an antireflection film having a fine uneven structure, the film containing an aluminum oxide crystal, was formed on the surface of the monitor glass.

(Adhesion of Organic Amine Compound)

1.0 Gram of a curing agent jER CURE H30 (trade name) manufactured by Mitsubishi Chemical Corporation serving as an amine-based curing agent material was weighed in an aluminum foil cup, and was sealed in a large petri dish together with the sample. After that, the entirety of the large petri dish was subjected to a heat treatment in an oven at 90° C. for 2 hours. The treatment caused an organic amine compound volatilized from the curing agent to adhere to the surface of the antireflection film.

(Exhaust Gas Test)

Based on the CSE standard, the sample was sealed in a space in which a. $SO_2$ concentration had been adjusted to 5 ppm, and was placed in an environment having a temperature of 25° C. and a humidity of 65% for 10 hours.

(Performance Evaluation)

No fogging occurred in the appearance of the sample after the exhaust gas test.

The average reflectance of the sample before the exhaust gas test was 0.06, and the average reflectance thereof after the test was 0.09.

(Measurement of Presence Amount of $C_mH_nN^+$)

The surface of the sample was subjected to TOF-SIMS analysis, and peaks corresponding to $Al^+$ and $C_mH_nN^+$ were selected from the resultant positive ion spectrum, followed by the calculation of a ratio between their peak intensities. Measurement conditions are described below: apparatus: TOF-SIMS IV manufactured by ION-TOF GmbH; primary ion: $Ga^+$; and acceleration voltage: 25 kV.

As a result of the TOF-SIMS analysis, a peak having the highest intensity out of $C_mH_nN^+$ peaks of interest was that of $C_6H_{12}N^+$, and its peak intensity was 4.0E+03. In addition, the peak intensity of $Al^+$ was 5.0E+05, and hence the ratio "$C_mH_nN^+/Al^+$" was 8.0E–03.

EXAMPLE 2

In Example 2, a sample was produced under the same conditions, and by the same operations, as those of Example 1 with the exception that the amine-based curing agent material to be used was changed to a curing agent EH-235R-2 (trade name) manufactured by Adeka Corporation, followed by its performance evaluations.

No fogging occurred in the appearance of the sample after the exhaust gas test.

The average reflectance of the sample before the exhaust gas test was 0.12, and the average reflectance thereof after the test was 0.18.

As a result of the TOF-SIMS analysis, a peak having the highest intensity out of $C_mH_nN^+$ peaks of interest was that of $C_3H_6N^+$, and its peak intensity was 2.1E+03. In addition, the peak intensity of $Al^+$ was 2.2E+05, and hence the ratio "$C_mH_nN^+/Al^+$" was 9.5E–03.

EXAMPLE 3

In Example 3, a sample was produced under the same conditions, and by the same operations, as those of Example 1 with the exception that a proper amount of a solution obtained by mixing 0.5 g of the jER CURE H30 in 100 g of PGME was dropped on the surface of the monitor glass, and spin coating was performed at a number of revolutions of 4,000 rpm for 20 seconds, followed by its performance evaluations.

No fogging occurred in the appearance of the sample after the exhaust gas test.

The average reflectance of the sample before the exhaust gas test was 0.15, and the average reflectance thereof after the test was 0.21.

As a result of the TOF-SIMS analysis, a peak having the highest intensity out of $C_mH_nN^+$ peaks of interest was that of $C_6H_{12}N^+$, and its peak intensity was 6.0E+01. In addition, the peak intensity of $Al^+$ was 3.8E+05, and hence the ratio "$C_mH_nN^+/Al^+$" was 1.6E–04.

EXAMPLE 4

In Example 4, an antireflection film was produced not by the wet coating of the monitor glass with a sol-gel film but by sputter deposition. Specifically, deposition was performed as follows: aluminum was used as a target; 10 sccm of each of an Ar gas and an $O_2$ gas was flowed; a deposition pressure was set to 0.4 Pa; a voltage was applied to the target by using a DC power source having an output of 300 W; and the deposition was performed for 50 minutes. A sample was produced under the same conditions, and by the same operations, as those of Example 1 except the foregoing, followed by its performance evaluations.

No fogging occurred in the appearance of the sample after the exhaust gas test.

The average reflectance of the sample before the exhaust gas test was 0.07, and the average reflectance thereof after the test was 0.10.

As a result of the TOF-SIMS analysis, a peak having the highest intensity out of $C_mH_nN^+$ peaks of interest was that of $C_6H_{12}N^+$, and its peak intensity was 3.8E+03. In addition, the peak intensity of $Al^+$ was 6.0E+05, and hence the ratio "$C_mH_nN^+/Al^+$" was 6.3E–03.

COMPARATIVE EXAMPLE 1

In Comparative Example 1, a sample was produced under the same conditions, and by the same operations, as those of Example 1 with the exception that the organic amine compound was not caused to adhere to the surface of the antireflection film, followed by its performance evaluations.

Fogging occurred in the appearance of the sample after the exhaust gas test.

The average reflectance of the sample before the exhaust gas test was 0.11, and the average reflectance thereof after the test was 0.62.

As a result of the TOF-SIMS analysis, a peak having the highest intensity out of $C_mH_nN^+$ peaks of interest was that of $C_6H_{12}N^+$, and its peak intensity was 4.0E+01. In addition, the peak intensity of was 4.8E+05, and hence the ratio "$C_mH_nN^+/Al^+$" was 8.3E–05.

COMPARATIVE EXAMPLE 2

In Comparative Example 2, a sample was produced under the same conditions, and by the same operations, as those of Example 3 with the exception that the amount of the organic amine compound jER CURE 1130 to be used was changed to 10 g, followed by its performance evaluations.

Fogging occurred in the appearance of the sample after the exhaust gas test.

The average reflectance of the sample before the exhaust gas test was 0.44, and the average reflectance thereof after the test was 0.46.

As a result of the TOF-SIMS analysis, a peak having the highest intensity out of $C_mH_nN^+$ peaks of interest was that of $C_6H_{12}N^+$, and its peak intensity was 3.2E+05 In addition, the peak intensity of was 5.4E−05, and hence the ratio "$C_mH_nN^+/Al^+$" was 5.9E−01. The results of Examples 1 to 4 and Comparative Examples 1 and 2 are collectively shown in Table 1.

TABLE 1

|  | TOF-SIMS analysis | | | Performance evaluation | | | |
|  | $C_mH_nN^+$ | | $Al^+$ | | Reflectance | | |
|  | Ion species | Peak intensity | Peak intensity | $C_mH_nN^+/Al^+$ | Appearance evaluation | Initial stage | After test | Overall evaluation |
| --- | --- | --- | --- | --- | --- | --- | --- | --- |
| Example 1 | $C_6H_{12}N^+$ | 4.0E+03 | 5.0E+05 | 8.0E−03 | A | 0.06 | 0.09 | B |
| Example 2 | $C_3H_6N^+$ | 2.1E+03 | 2.2E+05 | 9.5E−03 | A | 0.12 | 0.18 | B |
| Example 3 | $C_6H_{12}N^+$ | 6.0E+01 | 3.8E+05 | 1.6E−04 | A | 0.15 | 0.21 | B |
| Example 4 | $C_6H_{12}N^+$ | 3.8E+03 | 6.0E+05 | 6.3E−03 | A | 0.07 | 0.10 | B |
| Comparative Example 1 | $C_6H_{12}N^+$ | 4.0E+01 | 4.8E+05 | 8.3E−05 | C | 0.11 | 0.62 | D |
| Comparative Example 2 | $C_6H_{12}N^+$ | 3.2E+05 | 5.4E+05 | 5.9E−01 | A | 0.44 | 0.46 | D |

The optical element according to the present invention can be used in an optical instrument, such as a camera, a pair of binoculars, a microscope, a semiconductor exposure apparatus, or an interchangeable lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-243013, filed Dec. 19, 2017, and Japanese Patent Application No. 2018-221464, filed Nov. 27, 2018 which are hereby incorporated by reference herein in their entirety.

What is claimed is:

1. An optical element comprising:
   a substrate; and
   a film provided on the substrate, the film having a layer including protrusions or particles, which form a porous structure,
   wherein a positive ion spectrum of the protrusions or particles measured by TOF-SIMS has a peak of $C_mH_nN^+$, where m represents an integer of 1 to 8, and n represents an integer of 2 to 16.

2. The optical element according to claim 1, wherein a ratio of a peak intensity of $C_mH_nN^+$ to a peak intensity of $Al^+$ in the positive ion spectrum is 1E−04 or more.

3. The optical element according to claim 2, wherein the ratio is 1E−04 to 1E−02.

4. The optical element according to claim 1, wherein a ratio of a peak intensity of $C_mH_nN^+$ to a peak intensity of $Al^+$ in the positive ion spectrum is 1.6E−04 to 9.5E−03.

5. The optical element according to claim 1, wherein a ratio of a peak intensity of $C_mH_nN^+$ to a peak intensity of $Si^+$ in the positive ion spectrum is 1E−04 or more.

6. The optical element according to claim 5, wherein the ratio is 1E−04 to 1E−02.

7. A method of producing the optical element according to claim 1, the method comprising:
   forming a crystal layer containing aluminum oxide on a substrate; and
   adhering an organic amine compound to the crystal layer, wherein the layer in the optical element includes the crystal layer.

8. An optical instrument comprising:
   an optical element; and
   a lens,
   wherein the optical element includes a substrate and a film provided on the substrate, the film having a layer containing an oxide with a porous structure,
   wherein a positive ion spectrum of the layer measured by TOF-SIMS has a peak of $C_mH_nN^+$ and a peak of $Al^+$ or $Si^+$, where m represents an integer of 1 to 8, and n represents an integer of 2 to 16.

9. The optical instrument according to claim 8, wherein a ratio of a peak intensity of $C_mH_nN^+$ to a peak intensity of $Al^+$ in the positive ion spectrum is 1E−04 or more.

10. The optical instrument according to claim 9, wherein the ratio is 1E−04 to 1E−02.

11. The optical instrument according to claim 8, wherein a ratio of a peak intensity of $C_mH_nN^+$ to a peak intensity of $Al^+$ in the positive ion spectrum is 1.6E−04 to 9.5E−03.

12. The optical instrument according to claim 8, wherein a ratio of a peak intensity of $C_mH_nN^+$ to a peak intensity of $Si^+$ in the positive ion spectrum is 1E−04 or more.

13. The optical instrument according to claim 12, wherein the ratio is 1E−04 to 1E−02 or less.

14. The optical instrument according to claim 8, wherein the optical element is a lens or a cover.

15. The optical instrument according to claim 8, wherein the layer contains an organic amine compound.

16. The optical instrument according to claim 8, wherein the peak of $C_mH_nN^+$ is a peak of $C_6H_{12}N^+$ or $C_3H_6N^+$.

17. The optical instrument according to claim 8, wherein the film includes, between the layer and the substrate, a polymer layer.

18. The optical element according to claim 1, wherein the protrusions or particles contain an organic amine compound.

19. The optical element according to claim 1, wherein the peak of $C_mH_nN^+$ is a peak of $C_6H_{12}N^+$ or $C_3H_6N^+$.

20. The optical element according to claim 1, wherein the film includes, between the layer and the substrate, a polymer layer.

* * * * *